US012497275B2

(12) United States Patent
Vangal Ramamurthy et al.

(10) Patent No.: US 12,497,275 B2
(45) Date of Patent: Dec. 16, 2025

(54) APPARATUS FOR MOVING A PAYLOAD

(71) Applicant: OMRON Corporation, Kyoto (JP)

(72) Inventors: Swaminathan Vangal Ramamurthy, Singapore (SG); Rajaram Jayaraman, Singapore (SG); Pragaasam Ramalingam, Singapore (SG); Raja Nagarajan, Singapore (SG)

(73) Assignee: OMRON CORPORATION, Kyoto (JP)

( * ) Notice: Subject to any disclaimer, the term of this patent is extended or adjusted under 35 U.S.C. 154(b) by 190 days.

(21) Appl. No.: 18/362,183

(22) Filed: Jul. 31, 2023

(65) Prior Publication Data

US 2024/0034603 A1 Feb. 1, 2024

(30) Foreign Application Priority Data

Aug. 1, 2022 (SG) .......................... 10202250647R

(51) Int. Cl.
*B66F 9/06* (2006.01)
*G05D 1/00* (2024.01)
(52) U.S. Cl.
CPC ........... *B66F 9/063* (2013.01); *G05D 1/0246* (2013.01)
(58) Field of Classification Search
CPC .............................. B66F 9/063; G05D 1/0246
See application file for complete search history.

(56) References Cited

U.S. PATENT DOCUMENTS

| 4,998,858 A | 3/1991 | Magens |
| 5,211,527 A | 5/1993 | Ahlsen et al. |
| 2015/0314988 A1* | 11/2015 | Lowe ................... B66F 7/0666 187/269 |

(Continued)

FOREIGN PATENT DOCUMENTS

| DE | 1196124 B | 7/1965 |
| JP | H0624695 B2 | 2/1994 |

(Continued)

OTHER PUBLICATIONS

EPO Extended European Search Report for corresponding EP Application No. 23184560.3; Dated Dec. 21, 2023; 5 pages.

(Continued)

*Primary Examiner* — Hunter B Lonsberry
*Assistant Examiner* — Harrison Heflin
(74) *Attorney, Agent, or Firm* — CANTOR COLBURN LLP

(57) ABSTRACT

An apparatus for moving a payload, comprising: a driving mechanism; a lifting device; one or more load bearing surfaces, and a central wall, a first side wall and a second side wall that are arranged to form a boundary defining a space for residing the lifting device; an attachment mechanism mounted to the lifting device; and a processor configured to operate the apparatus to: control the lifting device to lift the payload and place the payload on the one or more load bearing surfaces; and control the driving mechanism to move the apparatus to transport the payload to a location, wherein the lifting device is in a stowed configuration when not in use, wherein the first side wall/the second side wall comprises one or more actuators comprising an extendable member extendable to engage the lifting device to support it at above ground level.

17 Claims, 7 Drawing Sheets

(56) References Cited

U.S. PATENT DOCUMENTS

2019/0352158 A1\* 11/2019 Tani ................ B66F 9/063
2022/0055876 A1\* 2/2022 Bangalore Srinivas ..................
                                                    B66F 9/122
2023/0392403 A1\* 12/2023 Choi ................ E04H 6/305
2024/0336463 A1\* 10/2024 Finley ............ B66F 9/07581

FOREIGN PATENT DOCUMENTS

JP    H10167688 A    6/1998
JP    2018165081 A   10/2018

OTHER PUBLICATIONS

JPO First Office Action issued for corresponding JP Application No. 2023-124085; dated Feb. 13, 2023; 10 pages.

\* cited by examiner

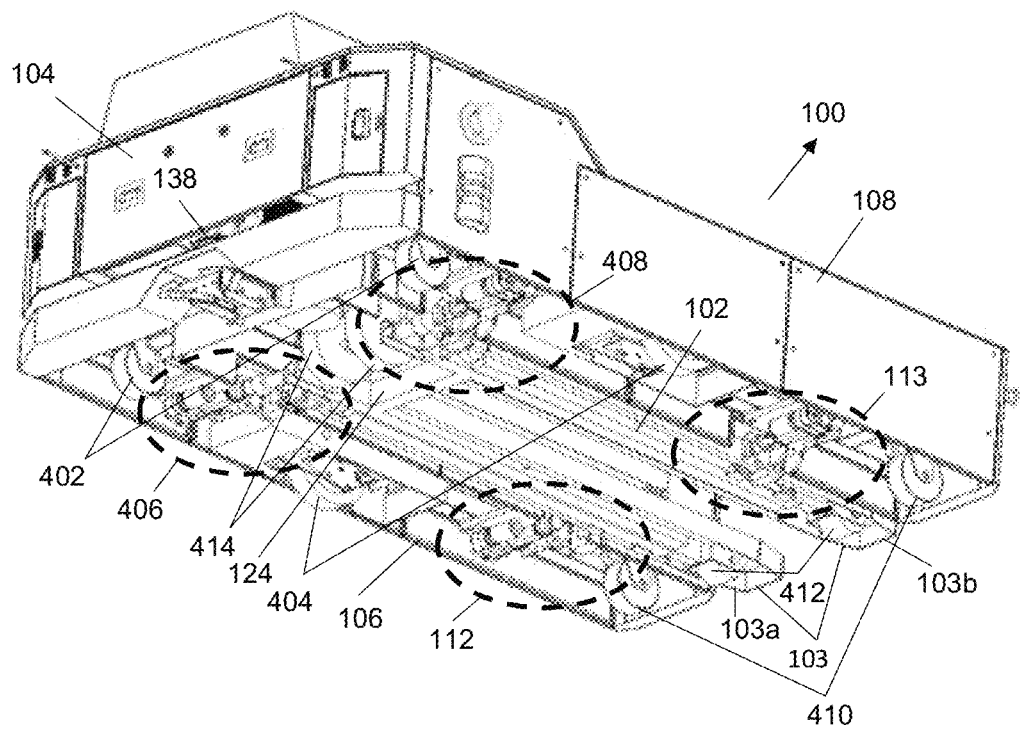
FIG. 4
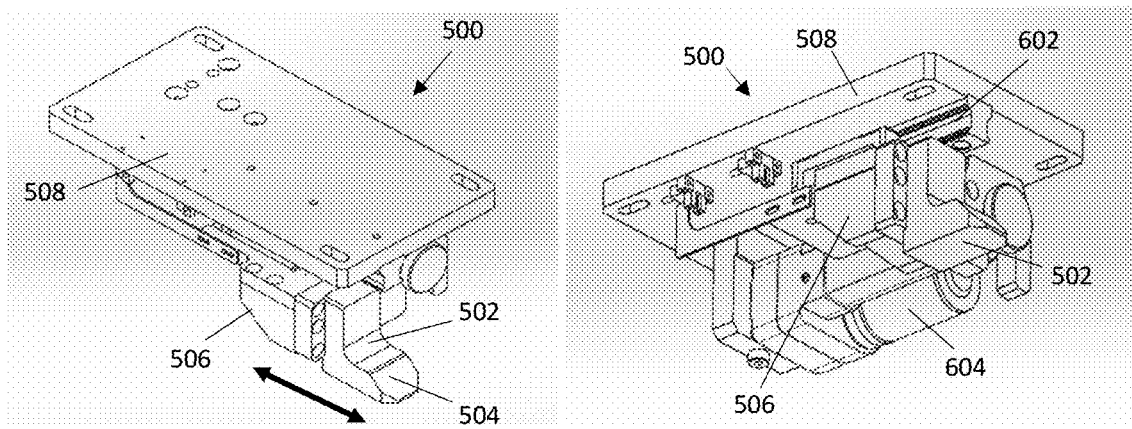
FIG. 5  FIG. 6

APPARATUS FOR MOVING A PAYLOAD

CROSS REFERENCES TO RELATED APPLICATIONS

The present invention claims priority under 35 U.S.C. § 119 to Singapore Application, 10202250647R, filed on Aug. 1, 2022, the entire contents of which being incorporated herein by reference.

FIELD

The present invention relates to an apparatus for moving a payload. The apparatus may be an autonomous mobile robot and the payload may be an object or a pallet containing one or more objects.

BACKGROUND

A jack may be attached to an autonomous mobile robot so that the mobile robot can be programmed and tasked to perform payload lifting via the jack and payload transportation automatically. However, the jack has wheels for linear motions, which are not designed for moving together with the mobile robot. Some efforts to resolve this include replacing such wheels with unidirectional wheels but there are practical issues such as the unidirectional wheels are not designed for the jack, and those available in the market may not be able to take the weight of a loaded jack.

SUMMARY

According to an example of the present disclosure, there are provided an apparatus for moving a payload, as claimed in the independent claims. Some optional features are defined in the dependent claims.

BRIEF DESCRIPTION OF THE DRAWINGS

Examples in the present disclosure will be better understood and readily apparent to one skilled in the art from the following written description, by way of example only and in conjunction with the drawings, in which:

FIG. 4 shows a bottom perspective view of the mobile robot of FIG. 2.

FIG. 5 shows a top perspective view of an actuator for lifting and supporting a lifting device mounted to the mobile robot.

FIG. 6 shows a bottom perspective view of the actuator of FIG. 5.

DETAILED DESCRIPTION

Examples of the present disclosure relate to apparatuses such as an autonomous mobile robot (hereinafter "mobile robot"). A lifting device, for example, a jack, is mounted to or fixed to the mobile robot. The mobile robot can be configured to control the lifting device (e.g., to move the lifting device) to carry a payload. The payload may be a pallet containing one or more objects. After lifting the payload, the mobile robot may transport the payload to an intended location according to instructions (software code) as programmed for the mobile robot. For example, the payload may be a payload of a production line, a medical facility, an office environment, a food and beverage premise, a warehouse, a retail location, a hospitality premise, and the like.

The mobile robot can transport a payload by having the payload rest on one or more load bearing surfaces of the mobile robot and the payload's entire weight is carried by the mobile robot.

Figure 1:
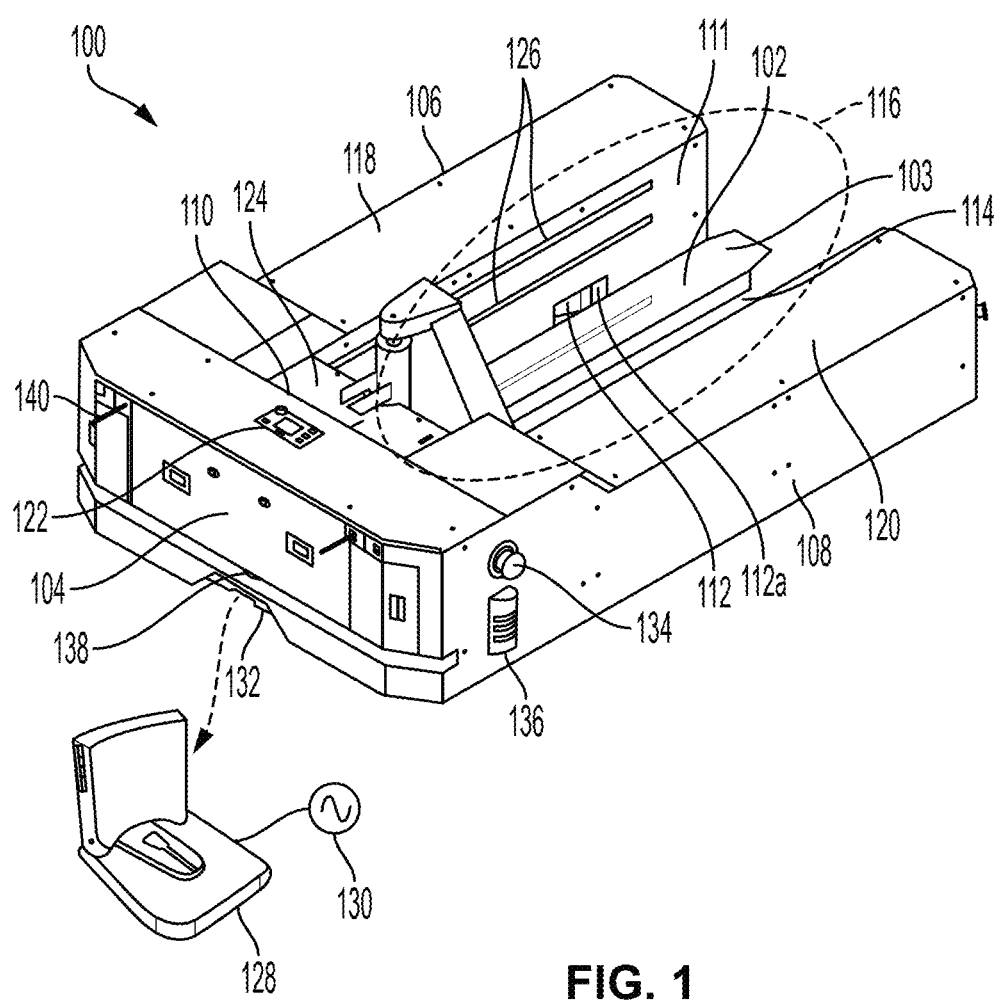
FIG. 1 shows a front perspective view of a mobile robot for moving a payload according to an example of the present disclosure.

In an example of the present disclosure, with reference to FIG. 1, there is provided an apparatus for moving a payload to an intended location. The apparatus of the present example is a mobile robot 100 comprising a lifting device 102. FIG. 1 shows a front perspective view of the mobile robot 100.

The mobile robot 100 has a power supply (e.g., a battery) residing within a housing of the mobile robot 100; one or more parts for mobility (hidden in FIG. 1; located at the bottom of the mobile robot 100), such as one or more wheels (or alternatively, tracks), and a driving mechanism (residing within the housing) such as a motor for driving the one or more parts for mobility to move the mobile robot 100. With regard to the driving mechanism and the one or more parts for mobility, they can be configured to have a differential drive type of steering and/or be implemented using other suitable driving/steering methods like 4-wheel drive. The driving mechanism can be powered by the power supply. The power supply can be re-chargeable and the mobile robot 100 is configured to move to and connect with a docking station connected to a power source to charge the power supply. The mobile robot 100 can also have a braking system for stopping and/or to apply brakes when the mobile robot 100 is controlled to push (or extend) or pull (retract) the lifting device 102 (carrying or not carrying payload).

The lifting device 102 in this example is a jack, or specifically, a pallet jack. This jack can be a hydraulic and/or pneumatic pallet jack. The payload can be a suitable object to be transported. In the present example, the payload is a pallet containing one or more objects. The lifting device 102 has a rear portion 124 mounted to the mobile robot 100. The hydraulic and/or pneumatic components of the lifting device 102 reside in the rear portion 124. The lifting device 102 is in a stowed configuration when it is not in operation and can be moved into an extended configuration when it is in operation. The lifting device 102 comprises a pair of forks 103. When the lifting device 102 is in the extended configuration, the pair of forks can be inserted into gaps at a bottom of the pallet prior to lifting the pallet. In the present example, the lifting device 102 is a pallet jack with wheels (not visible in FIG. 1), and the wheels are above ground level when the lifting device is in the stowed configuration.

The mobile robot 100 comprises a controller, processor, or processing unit, which is located in the central wall 104 in the present example. The controller, processor, or processing unit executes instructions in a memory to operate the mobile robot 100 to autonomously navigate to a payload (not shown in FIG. 1), and take the following actions:

1) control the lifting device 102 to move from the stowed configuration to the extended configuration,
2) control the lifting device 102 in the extended configuration to engage the payload,
3) control the lifting device 102 to lift the payload,
4) with the lifting device 102 staying stationary, move the mobile robot 100 until the lifting device 102 carrying the payload resides in the space 116,
5) control the lifting device 102 to lower the payload to rest the payload on one or more load bearing surfaces (in the present example, the load bearing surfaces 118 and 120) of the mobile robot 100; and
6) move the payload carried by the mobile robot 100 to an intended location.

The mobile robot 100 is also controllable by the controller, processor, or processing unit to take the following actions:

a) control the lifting device 102 to lift up the payload resting on the one or more load bearing surfaces (118 and 120) from its stowed configuration,
b) with the lifting device 102 staying stationary, move the mobile robot 100 until the lifting device 102 carrying the payload changes into the extended configuration,
c) control the lifting device 102 to place the payload at the intended location; and
d) control the lifting device 102 to change into the stowed configuration.

The mobile robot 100 has a body comprising a central wall 104, a first side wall 106 and a second side wall 108. The body resembles a U or C shape. The first side wall 106 and the second side wall 106 extend away from the central wall 104. The central wall 104, the first side wall 106 and the second side wall 108 are arranged such that they form a boundary defining a space 116 for residing the lifting device 102. Specifically, a surface 110 of the central wall 104, a surface 111 of the first side wall 106 and a surface 114 (not visible in FIG. 1) of the second side wall 108 form such boundary. The first side wall 106 and second side wall 108 are parallel to each other and orthogonal to the central wall 104. In the present example, a top portion 118 of the first side wall 106 comprises a first load bearing surface and a top portion 120 of the second side wall 108 comprises a second load bearing surface. The boundary created by the central wall 104, the first side wall 106 and the second side wall 108 of the mobile robot 100 is opened at one side for the lifting device 102 to move and extend out of the space 116 when it is required to lift one or more objects outside the space 116.

Outermost edges of the central wall 104, the first side wall 106 and the second side wall 108 form the edges of the body of the mobile robot 100. These outermost edges determine the dimensions (i.e., length and width) of a footprint of the mobile robot 100. The distance between the first side wall 106 and the second side wall 108 can be configured such that a payload, which is an object or pallet (with or without objects on it), can be placed on the top portion 118 and the top portion 120, and the length and width of a base of the payload does not exceed the dimensions of the footprint of the mobile robot 100. In the case of a pallet (with or without objects on it), the base of the payload refers to the pallet. In the case of an object, the base of the payload refers to the bottom of the object to be placed on the top portion 118 and the top portion 120. In this manner, provided that the object on top of the pallet do not have dimensions exceeding the dimensions of the footprint, the payload placed on the first side wall 106 and/or the second side wall 108 would fit compactly within the footprint of the mobile robot 100 and fully utilize the volume within the footprint. The heights of the top portions 118 and 120 are preferably the same height.

Figure 2:
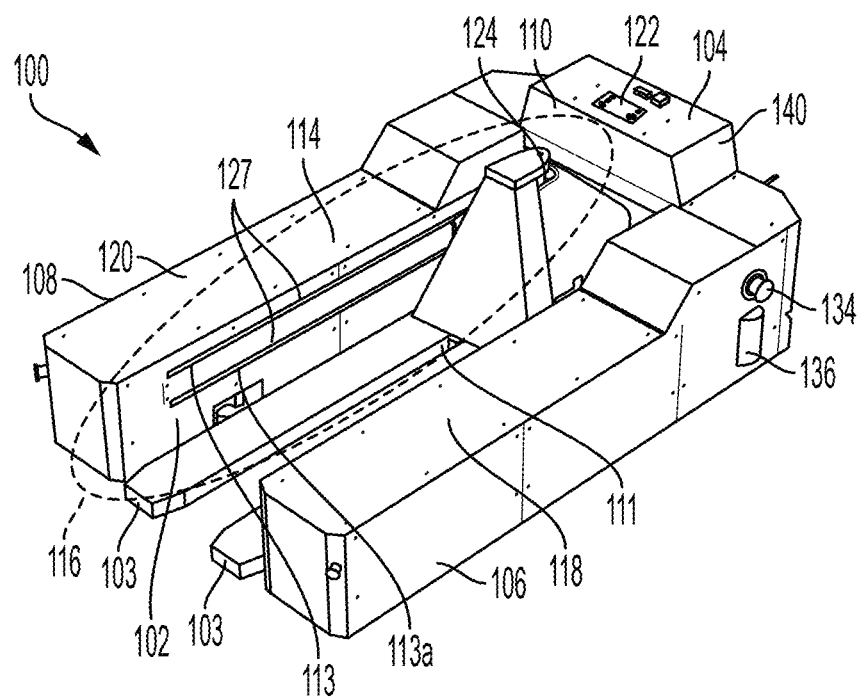
FIG. 2 shows a rear perspective view of a mobile robot mounted with a lifting device according to an example of the present disclosure.
Figure 3:
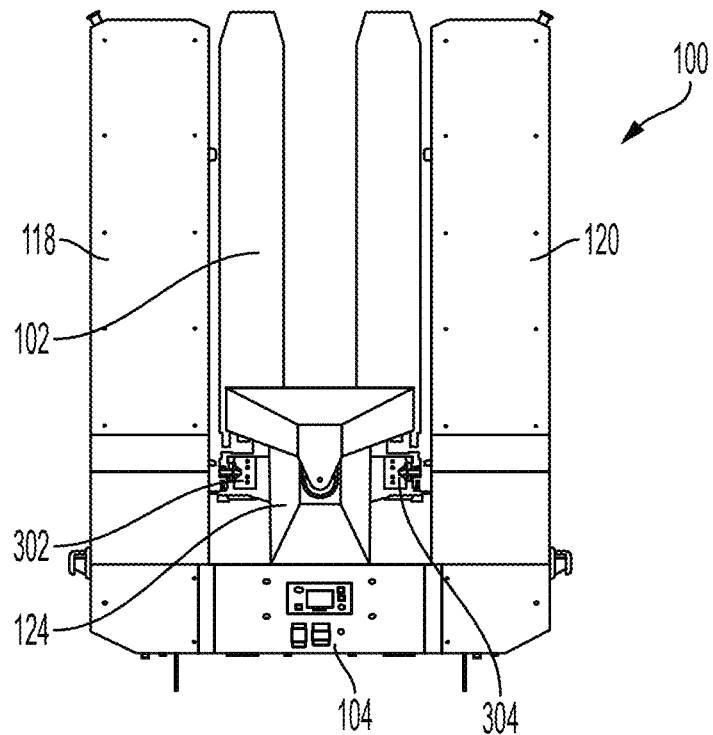
FIG. 3 shows a top view of the mobile robot of FIG. 2.

The following paragraphs make reference to elements in FIG. 1 to FIG. 3.

FIG. 2 is a rear perspective view of the mobile robot 100 revealing some features not visible in FIG. 1. FIG. 3 is a top view of the mobile robot 100 of FIG. 2. FIG. 3 illustrates how the rear portion 124 of the lifting device 102 is mounted to the mobile robot 100. Specifically, left and right sides of the rear portion 124 of the lifting device 102 are mounted to the mobile robot 100 via one or more attachment members i.e., the side members 302 and 304. The reference numerals used in FIG. 1 are used for the same elements in FIG. 2 and FIG. 3.

The mobile robot 100 comprises one or more motors (not visible in the Figures) for moving the lifting device 102 to extend it out of the space 116 to engage the payload and to retract it into the space 116. The one or more motors can include a closed loop motor i.e., a closed loop system is used. Such closed loop system uses feedback where a portion of an output signal is fed back to an input to reduce errors and improve stability. In the present example, there is a motor connected to the side members 302 and 304. The motor may be located within the side member 302, the side member 304, the rear portion 124, the central wall 104, the first side wall 106 or the second side wall 108. The side members 302 and 304 are slidable along horizontal tracks located on the first side wall 106 and located on the second side wall 108 respectively. In FIG. 1, two horizontal tracks 126 located on the first side wall 106 are shown. There are two similar horizontal tracks (not visible in FIG. 1; 127 in FIG. 2) located on the second side wall 108. The motor is controllable by the controller, processor, or processing unit to move the side members 302 and 304 along these horizontal tracks 126 and 127 to push or extend the lifting device 102 into the extended configuration so that the forks 103 of the lifting device 102 is able to insert the bottom of the pallet or so that the forks 103 carrying a payload is able to place the payload on the ground. Although, in the above example, two tracks are provided on each of the first side wall 106 and the second side wall 108, it should be appreciated that in another example, only one track, or more than two tracks, may be provided on each side wall, as practically required.

The motor may also be configured to move the side members 302 and 304 to pull or retract the lifting device 102 carrying the payload back into the space 116. However, alternatively, the mobile device 102 may be driven, while the extended lifting device 102 that is carrying the payload stays stationary, until the lifting device 102 resides in the space 116. This alternative may use lesser energy because more energy is required to move the lifting device 102 that is carrying a payload.

In one example, the motor and side members 302 and 304 may serve another purpose. That is, in the case that the lifting device 102 is a jack with wheels, the motor is controllable by the controller, processor or processing unit to move the side members 302 and 304 so as to lift the lifting device 102 to change into the stowed configuration and ensure that wheels of the lifting device 102 are above ground level i.e., not contacting the ground. This ensures that the wheels of the lifting device 102 do not interfere with the movements of the mobile robot 100. The motor may also be controllable by the controller, processor, or processing unit to move the side members 302 and 304 so as to lower the lifting device 102 and allow the wheels of the lifting device 102 to rest on the ground. The wheels of the pallet jack are designed for linear movements and the wheels can be used to facilitate movement of the lifting, device 102 out of the space 116 to change into the extended configuration. To enable the motor and the side members 302 and 304 to lift or lower the lifting device 102 to disallow or allow its wheels to rest on the ground, vertical tracks (not visible in FIG. 1) that are vertically arranged can be provided for the side members 302 and 304 to move along during the lifting or lowering motions of the lifting device 102.

The following paragraphs make reference to elements in FIG. 1 to FIG. 8. FIG. 1 to FIG. 4 and FIG. 7 and FIG. 8 show the mobile robot 100, whereas FIG. 5 and FIG. 6 show one or more actuators (112 in FIG. 1, 113 in FIGS. 2, 406 and 408 in FIG. 4, 500 in FIG. 5 and FIG. 6, and 406 and 408 in FIG. 7 and FIG. 8) which will be described below. The same reference numerals are given for the same elements present in these Figures.

Specifically, the first side wall 106 and/or the second side wall 108 comprise the one or more actuators (e.g., 112, 113, 406, 408 and 500). Each of the one or more actuators is configured to be retractable into one or more openings (e.g., 112a in FIGS. 1 and 113a in FIG. 2) of the first side wall 106 and/or the second side wall 108 and extendable into the space 116 to engage and support the lifting device 102 at above ground level in its stowed configuration.

FIG. 4 shows a bottom perspective view of the mobile robot 100. All the parts for mobility of the mobile robot 100 and the lifting device 102, which are wheels in the present example, are shown in FIG. 4. Specifically, FIG. 4 shows the mobile robot 100 comprising front side wheels 402 located near the left and right sides of the mobile robot 100, rear side wheels 410 located near the left and right sides of the mobile robot 100, and central side wheels 404 located near the left and right sides of the mobile robot 100. The central side wheels 404 are driving wheels controllable by the driving mechanism of the mobile robot, whereas the front side wheels 402 and the rear side wheels 410 are idler wheels. Furthermore, FIG. 4 shows the lifting device 102 comprising two rear wheels 414 at the rear portion 124 of the lifting device 102 and each of the pair of forks 103 of the lifting device 102 comprises a front wheel 412 near the front end of each fork 103. Specifically, a left side fork 103a of the pair of forks 103 comprises the front wheel 412, and a right side fork 103b of the pair of forks 103 comprises the front wheel 412.

In the present example, with reference to FIG. 4, the number of the one or more actuators is four, wherein a first actuator 406 is located at a bottom of the first side wall 106 closer to the central wall 104, a second actuator 112 is located at a bottom of the first side wall 106 further away from the central wall 104 and closer to an end of the first side wall 106, a third actuator 408 is located at a bottom of the second side wall 108 closer to the central wall 104, and a fourth actuator 113 is located at a bottom of the second side wall 108 further away from the central wall 104 and closer to an end of the second side wall 108.

FIG. 5 and FIG. 6 show an actuator 500 that can be used as the actuator 113 and 408. Reference will be made to the mobile device 100, the lifting device 102, the space 116, and the forks 103 described earlier. An actuator that is a mirror image of the actuator 500 can be used as the actuator 112 and 406. The actuator 500 comprises a top plate 508 for mounting to the body of the mobile robot 100, a track line 602, an actuator motor 604 and a lifting member 506. The track line 602 is mounted to the bottom of the top plate 508. The lifting member 506 is for lifting the lifting device 102. The lifting member 506 is configured to be movable linearly along the track line 602 under the control of the actuator motor 604 in the directions shown by a double-sided arrow in FIG. 5. The lifting member 506 comprises an engagement member 502 for engaging the lifting device 102, or specifically, to engage one of the forks 103 of the lifting device 102. The engagement member 502 has a sloped edge 504 for engaging the fork 103. The sloped edge 504 moves when the actuator motor 604 moves the lifting member 506. The sloped edge 504 is movable in this manner to contact a bottom portion of the fork 103 and push against the bottom portion of the fork 103 to lift the lifting device 102 according to a gradient of the sloped edge. Specifically, the sloped edge 504 is extendable into the space 116 to lift the lifting device 102 until its wheels (412 and 414 in FIG. 4) are above ground level. After the lifting device 102 are above ground by a predetermined height, the lifting device 102 is in the stowed configuration. The sloped edge 504 will stay in position to support the lifting device 102 in the stowed configuration. The sloped edge 504 is also retractable out of the space 116 to lower the lifting device 102 until its wheels (412 and 414 in FIG. 4) rest on the ground. When the wheels (412 and 414 in FIG. 4) of the lifting device 102 are on the ground, the lifting device 102 is ready to be moved out of the space 116 and change into the extended configuration. The actuator motor 604 is controllable by the controller, the processor, or the processing unit of the mobile robot 100.

Figure 7:
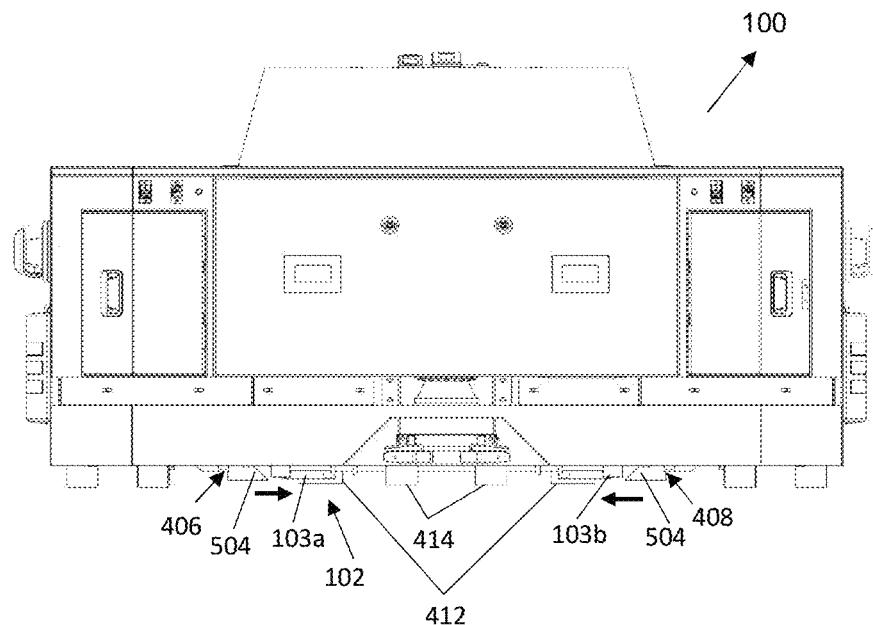
FIG. 7 shows a front view of the mobile robot of FIG. 2, wherein wheels of the lifting device can contact the ground and two actuators for lifting the lifting device are not yet activated.

FIG. 7 shows a front view of the mobile robot 100 described above, wherein the wheels 412 and 414 of the lifting device 102 can contact the ground. In this view, although only the actuators 406 and 408 and their respective sloped edge 504 are visible, it is understood that the other actuators 112 and 113 have the same function as them. The actuator motors 604 of the actuators 112, 113, 406 and 408 are controllable by the controller, processor, or processing unit of the mobile device 100 to lift the left side fork 103a and the right side fork 103b respectively, which will lift the lifting device 102 into the stowed configuration. In FIG. 7, the sloped edge 504 has not yet been extended in the directions of the arrows shown in FIG. 7 to engage, lift, and support the lifting device 102.

Figure 8:
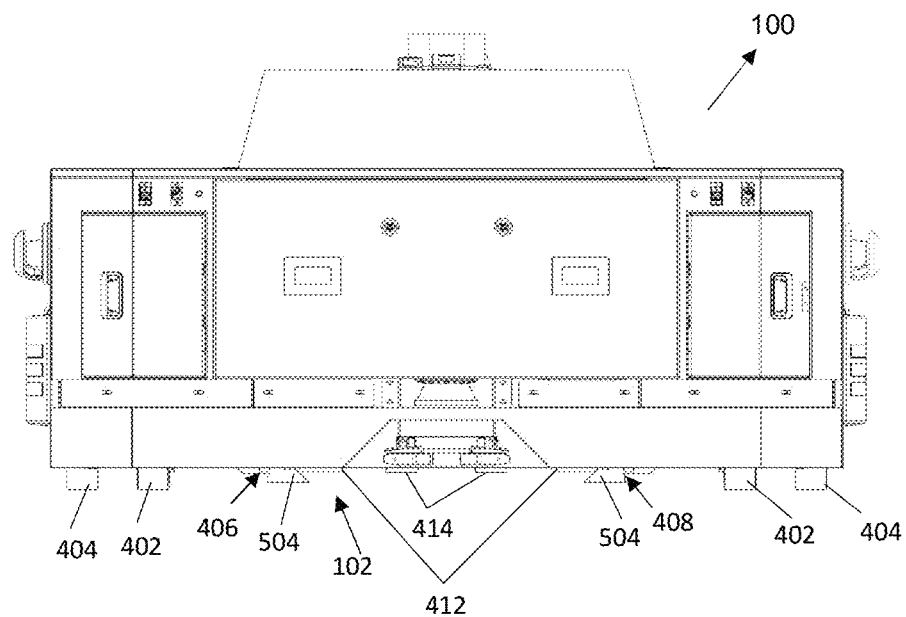
FIG. 8 shows a front view of the mobile robot of FIG. 2, wherein wheels of the lifting device are off the ground and the two actuators for lifting the lifting device are activated.

FIG. 8 shows a front view of the mobile robot 100, wherein wheels 412 and 414 of the lifting devices 102 are off the ground and will not interfere with the movements of the wheels 402, 404 and 410 of the mobile device 100. The actuators 112, 113, 406 and 408 have been activated for lifting the lifting device 102. The sloped edge 504 has been extended to engage, lift, and support the lifting device 102 in the stowed configuration.

Although it is described above that the one or more actuators (e.g., 112, 113, 406 and 408) is able to lift the lifting device 102, in another example, the one or more actuators (e.g., 112, 113, 406 and 408) may be used only to engage and support the lifting device 102 at above ground level in the stowed configuration. In this case, another device or mechanism would be used to lift and lower the lifting device 102. The one or more actuators (e.g., 112, 113, 406 and 408) only engage and support the lifting device 102 after it is lifted and only disengage from the lifting device 102 after it is lowered. In other words, the one or more actuators are used only as securing or locking mechanisms for securing or locking the lifting device 102 in the stowed configuration.

An example of the operation of the one or more actuators (e.g., 112, 113, 406 and 408) of the mobile robot 100 can be described as follows.

Specifically, the mobile robot 100 is controllable by the controller, processor, or processing unit to:
(i) control the lifting device 102 to lift the payload to a position higher than the height of the top portion 118 of the first side wall 106 and the height of the top portion 120 of the second side wall 108,
(iii) control the lifting device 102 to lower the payload to place the payload on the top portion 118 of the first side wall 106 and the top portion 120 of the second side wall 108 and to change into the stowed configuration; and
(iv) control the one or more actuators (e.g., 112, 113, 406 and 408) to engage and support the lifting device 102 at above ground level in the stowed configuration.

Furthermore, the mobile robot 100 is controllable to:
1) control the lifting device 102 to lift a payload placed on the top portion 118 of the first side wall 106 and the top portion 120 of the second side wall 108,
2) perform movements (e.g., to move the mobile robot 100 or to move the lifting device 102) to let the lifting device 102 change into the extended configuration,
3) control the lifting device 102 in the extended configuration to lower and place the payload at an intended location to place the payload,
4) perform movements (e.g., to move the mobile robot 100 or to move the lifting device 102) to let the lifting device to change into the stowed configuration; and
5) control the one or more actuators (e.g., 112, 113, 406 and 408) to engage and support the lifting device at above ground level in the stowed configuration.

Referring back to FIG. 1, the mobile robot 100 may comprise an electrical connector configured to connect to the lifting device 102 to provide power to operate the lifting device 102. Other than power, data can also be transmitted through the electrical connector by providing data communication wiring in addition to power lines. The exchanged data may comprise commands to instruct the lifting device 102 to lift/lower payload and also report the statuses (e.g., weight) of the payload.

Furthermore, the mobile robot 100 is an autonomous mobile robot that has self-navigation and/or self-mapping systems on board. The controller, processor or processing unit controls its movements. Wireless communication devices can be provided in the mobile robot 100 to enable wireless communication via WIFI, telecommunication networks such as 3G, 4G, 5G, and the like. Antennas 140 can be provided to enable such wireless communication. Instructions to control the tasks of the mobile robot 100 can be communicated wirelessly. The controller or processor can be connected to user input devices and/or a display for displaying a graphical user interface to take in user input. User input provided via the user input devices and/or graphical user interface can comprise instructions to control the lifting device 102, tasks of the mobile robot 100 and its movements. In the example of FIG. 1, the mobile robot has a control panel 122 that comprises such display and such user input devices.

The mobile robot 100 can have traffic control systems to avoid collision and to optimize movements relative to other mobile robots also operating with the mobile robot 100 in the same environment. Through executing instructions by the processor, the mobile robot 100 can be operable to activate the driving mechanism to move the mobile robot 100 to transport a payload placed on the mobile robot 100 to an intended location according to the instructions. For example, the intended location can be a location in a production line for loading and unloading objects (e.g., the load) and/or to undertake a specific task.

Furthermore, the mobile robot 100 can have one or more sensors. The controller, processor, or processing unit of the mobile robot 100 can be configured to receive input from the one or more sensors and operate the mobile robot 100 to receive input from the one or more sensors to align the mobile robot 100 with the payload prior to controlling the motor connected to the attachment mechanism 124 to move the lifting device 102 for lifting or lowering payload. For example, with reference to FIG. 1, the mobile robot 100 has a LiDAR sensor (i.e., a navigation laser device) 138 and side lasers 134 on board. The self-navigation and/or self-mapping systems on board work with the LiDAR sensor 138 and side lasers 134 to enable the mobile robot 100 to perform self-navigation and/or self-mapping functions for autonomous movement in the surrounding environment. In the example of FIG. 1, the side lasers 134 are provided on left and right sides of the mobile robot 100. FIG. 1 shows the right side lasers 134.

The one or more sensors can be part of an existing cell alignment positioning system (CAPS) developed by Omron Corporation. CAPS uses a main safety scanning laser (i.e., the LiDAR sensor) to detect a geometry in an environment and enables the mobile robot 100 to drive to a specific location relative to that geometry during alignment conducted by the mobile robot 100. Specifically, CAPS can use point data information from the LiDAR sensor 138 arranged in a planar manner that is built into the mobile robot to align with reference targets (e.g., the payload) based on triangulation and other geometrical feature analysis. CAPS is just one method to enable the mobile robot 100 to conduct alignment with the payload. Other suitable methods can also be used.

In other examples, the one or more sensors can be or include cameras capturing images and alignment can be established based on image processing of captured images. The one or more sensors may also include laser, infrared and/or ultrasonic sensors. There may also be visual or smart labels or markers provided on the mobile robot 100 and/or the payload to facilitate alignment.

Specifically, the one or more sensors may be configured to read a machine-readable optical code (e.g., QR code or barcode) and/or a Radio-Frequency Identification tag provided on the payload to obtain information to facilitate engagement of the payload. For example, the information may include type of the payload, weight of the payload, dimensions of the payload, etc.

The one or more sensors may be configured to read the same machine-readable optical code and/or Radio-Frequency Identification tag as described above or another machine-readable optical code and/or Radio-Frequency Identification tag provided on the payload to obtain location data of the payload relative to the mobile robot 100 to facilitate the alignment of the mobile robot 100 with the payload. These one or more sensors may be used separately or together with the Lidar sensor 138 for CAPS. In the case of the use of machine-readable optical code to obtain location data, vision/image processing techniques (e.g., involving use of computer vision algorithms) may be used. The vision/image processing techniques may involve use of a camera to capture an image of the machine-readable optical code and applying image analysis on the captured image to determine coordinates of the payload relative to the mobile robot 100. An example of the vision/image processing technique is discussed in H. Zhang, C. Zhang, W. Yang and C. Chen, "Localization and navigation using QR code for mobile robot in indoor environment," 2015 IEEE International Conference on Robotics and Biomimetics (RO-BIO), Zhuhai, China, 2015, pp. 2501-2506, doi: 10.1109/ROBIO.2015.7419715.

With reference to FIG. 1, the mobile robot 100 has a charging port 132 for charging up the power supply of the mobile robot 100. The mobile robot 100 is configured to autonomously move and dock with a charging station 128 to commence the charging. The charging station 128 may be connected to Alternating Current (AC) Mains 130 supplying AC power, for instance via a wall socket.

Furthermore, with reference to FIG. 1, the mobile robot 100 has light indicators 136 for alerting and/or status notification purposes. For example, to show that error occurred, show fine or okay status, and/or show a warning of certain situation. In the example of FIG. 1, the light indicators 136 are provided on left and right sides of the mobile robot 100. FIG. 1 shows the right side light indicators 136.

Specifically, FIG. 2 shows the same mobile robot 100 as that shown in FIG. 1. The reference numerals in FIG. 1 are used for the same elements in FIG. 2. FIG. 2 shows a rear perspective view of the mobile robot 100. Some elements not visible in FIG. 1 are visible in FIG. 2, for instance:
a) surface 114 of the second side wall 108,
b) tracks 127 (located opposite to the tracks 126) which the sides members 302 and 304 of the attachment mechanism move along when the lifting device 102 is controlled to moved out of the space 116 to change into the extended configuration,
c) two forks of the pair of forks 103 are visible in FIG. 2 but only one of these forks are visible in FIG. 1,
d) side lasers 134 and the light indicators 136 located on the left side of the mobile robots are shown in FIG. 2; and
e) the fourth actuator 113 (for supporting the lifting device 102 in stowed configuration) that is located at the bottom of the second side wall 108 further away from the central wall 104 and closer to an end of the second side wall 108.

There is also a slight difference in the design rear portion 124 of the lifting device 102 in FIG. 1 and FIG. 2. This difference is not substantial and the lifting device 102 in both FIGS. 1 and 2 are worked the same way.

An example of a complete operation of the mobile robot 100 described above to transport a payload to an intended location is described as follows. Reference is made to elements in FIG. 1 to FIG. 14. In particular, FIG. 9 to FIG. 14 illustrates the same mobile robot 100 during different steps in the operation of the mobile robot 100 to transport a payload 902.

In the present example, the lifting device 102 is a pallet jack with wheels to facilitate its movement. The one or more actuators 112, 113, 406, and 408 are configured to engage and lift the lifting device 102 to change into its stowed configuration, wherein the wheels 412 and 414 of the lifting device 102 are above ground, and configured to lower the lifting device 102 from its stowed configuration until the wheels 412 and 414 of the lifting device 102 rest on the ground and disengage from the lifting device 102 after the wheels 412 and 414 rest on the ground. In the present example, the payload 902 is a pallet 904, which holds a plurality of objects on top of it.

Figure 9:
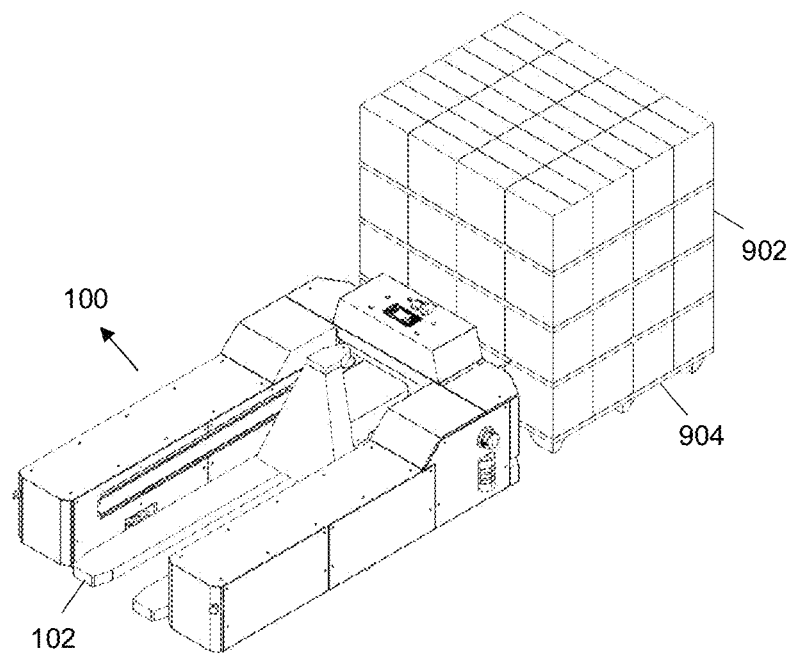
FIG. 9 shows the mobile robot of FIG. 2 with front side facing a payload.

In a step 1, the mobile robot 100 mounted with the lifting device 102 in the stowed configuration moves towards the payload 902 after receiving instructions wirelessly from a central control system to carry the payload 902 to transport the payload 902 to the intended location according to the instructions. A front side of the mobile robot 100 (i.e., the front side is where the Lidar sensor 138 is located) would face the payload 902 as the mobile robot 100 is moving towards the payload 902. FIG. 9 shows the mobile robot 100 with the front side of the mobile robot 100 facing the payload 902.

In a step 2, when the mobile robot 100 is moved to an area surrounding the payload 902, the mobile robot 100 detects the presence of the payload 902 through location information (e.g. coordinates in a map) received from the central control system, the Lidar sensor 138 mounted at the front of the mobile robot 100, and/or one or more mounted cameras mounted to the mobile robot 100 are used to scan the area for one or more visual markers (e.g. machine-readable optical code) of the payload 902 such as a QR code.

At a step 3, alignment of the mobile robot 100 with the payload 902 begins when the presence of the payload 902 is detected.

Figure 10:
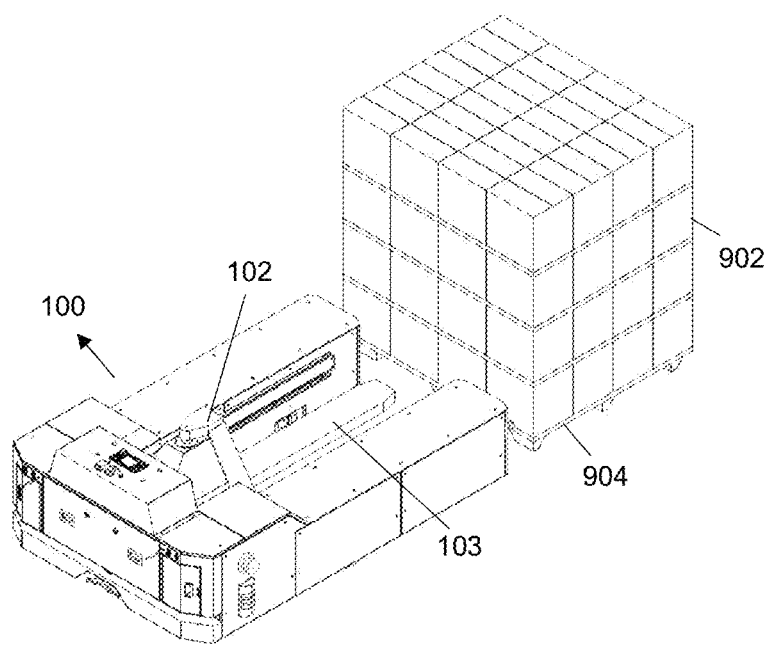
FIG. 10 shows the mobile robot of FIG. 9 with its rear side and a front side of the lifting device facing the payload of FIG. 9.

At a step 4 after the alignment at step 3, the mobile robot 100 rotates 180 degrees to have its rear portion (i.e., the rear is where the open side of the space for the lifting device 102 to exit is located) face the payload 902. FIG. 10 shows the mobile robot 100 with the rear side of the mobile robot 100 facing the payload 902. The forks 103 of the lifting device 102 are pointing in a direction of the payload 902.

In a step 5, the mobile robot 100 then reverses itself closer to the payload 902 and proceeds to engage the payload 902. At this point, the lifting device 102 is still residing in the space 116, is still in the stowed configuration supported by the one or more actuators 112, 113, 406, and 408, and its forks 103 are not elevated.

In one example, when the mobile robot 100 detects contact with the payload 902 after reversing itself sufficiently, for example via a sensor (e.g. using one or more cameras and vision techniques, a pressure sensor to detect contact with the payload 902, and/or an infrared sensor to detect distance of payload 902 to the mobile robot 100), the mobile robot 100 controls the one or more actuators 112, 113, 406, and 408 to lower the pair of forks 103 of the lifting device 102 until the wheels 412 and 414 of the lifting device 102 rest on the ground.

In another example, it could be that the mobile robot 100 relies on information gathered from one or more visual markers (e.g. machine-readable optical code) of the payload 902 such as a QR code to determine how much to reverse and adjust itself before controlling the one or more actuators 112, 113, 406, and 408 to lower the pair of forks 103 of the lifting device 102 until the wheels 412 and 414 of the lifting device 102 rest on the ground.

Figure 11:
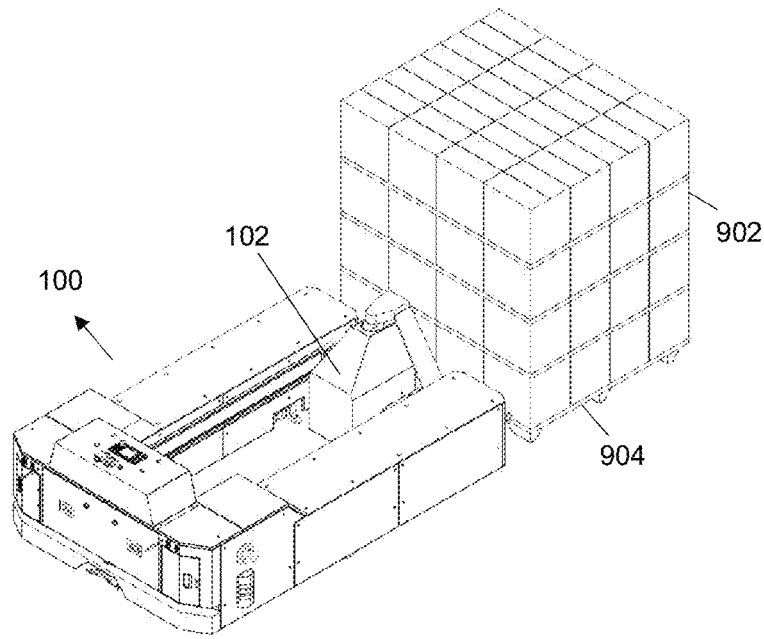
FIG. 11 shows the mobile robot of FIG. 10, wherein the lifting device is extended to engage a bottom of the payload of FIG. 9.

Specifically, the one or more actuators 112, 113, 406 and 408 are controlled to lower the lifting device 102 so that the front wheels 412 mounted close to the front of the forks 103 and one or more rear wheels 414 at the bottom of the rear portion 124 of the lifting device 102 are lowered to rest on the ground. These wheels 412 and 414 facilitate movement of the lifting device 102 to move out of the space 116 and change into the extended configuration. When the wheels 412 and 414 are on the ground, the one or more actuators 112, 113, 406, and 408 disengages from the lifting device 102. Thereafter, the mobile robot 100 either
1) controls a motor to move the side members 302 and 304 mounted to the lifting device 102 to push the lifting device 102 until the forks 103 are inserted between gaps of the pallet 904, or
2) with the lifting device 102 having wheels 412 and 414 resting on the ground staying stationary, moves itself forward until the lifting device 102 is in the extended configuration, and then reverses until the forks 103 are inserted between gaps of the pallet 904. Option 1) is the preferred action. FIG. 11 shows the lifting device 102 being adjusted until the forks (103; not visible in FIG. 11) are inserted between gaps at the bottom of the pallet 904 of the payload 902.

Figure 12:
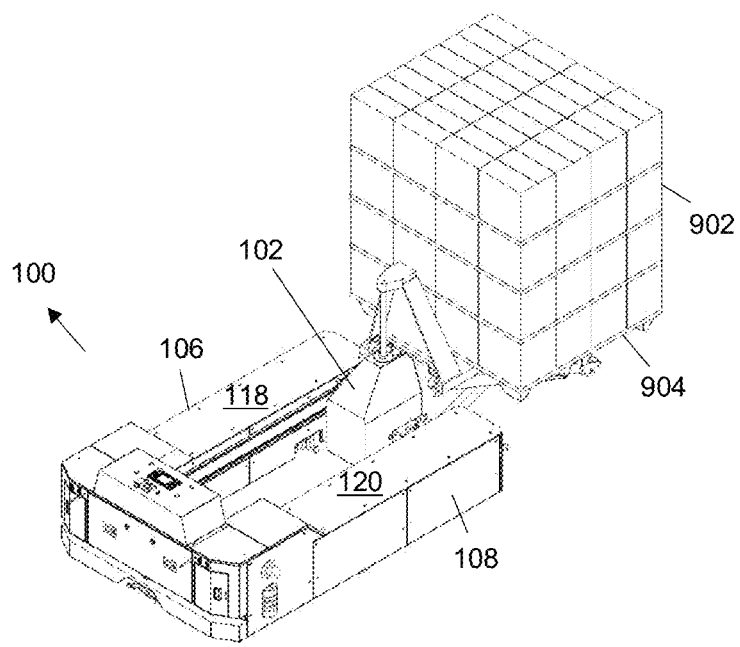
FIG. 12 shows the mobile robot of FIG. 11, wherein the extended lifting device is lifting the payload of FIG. 9 off the ground.

In a step 6, after the forks 103 are sufficiently extended into the gaps of the pallet 904, and the mobile robot 100 controls the lifting device 102 to raise the forks 103 to lift the pallet 904 along with the objects resting on it. The forks 103 are in an elevated configuration when they are raised to lift up the payload 902. FIG. 12 shows a configuration of the mobile device 100, wherein the lifting device 102 is in extended configuration and the forks (103; not visible in FIG. 12) carrying the payload are in an elevated configuration. Specifically, the forks are elevated to a height above the top portion 118 of the first side wall 106 and the top portion 120 of the second side wall 108 respectively.

In a step 7, once the forks 103 are elevated to a predetermined height, while the lifting device 102 stays stationary, the mobile robot 100 moves its body and reverses itself until the lifting device 102 carrying the payload 902 are residing within the space 116. The predetermined height of the forks 103 can be determined from payload information provided by the central control system, or from payload information detected by the mobile robot 100, for example, from a machine readable optical code provided on the payload 902 when the mobile robot 100 locates the payload 902. Both the lifting device 102 and the payload 902 will reside within the space 116 after the mobile robot 100 is reversed. In another example, the mobile robot 100 may move the lifting device 102 carrying the payload 902 into the space 116 using the one or more motors described earlier that are configured to push (or extend) or pull (or retract) the lifting device 102 instead of moving itself.

Figure 13:
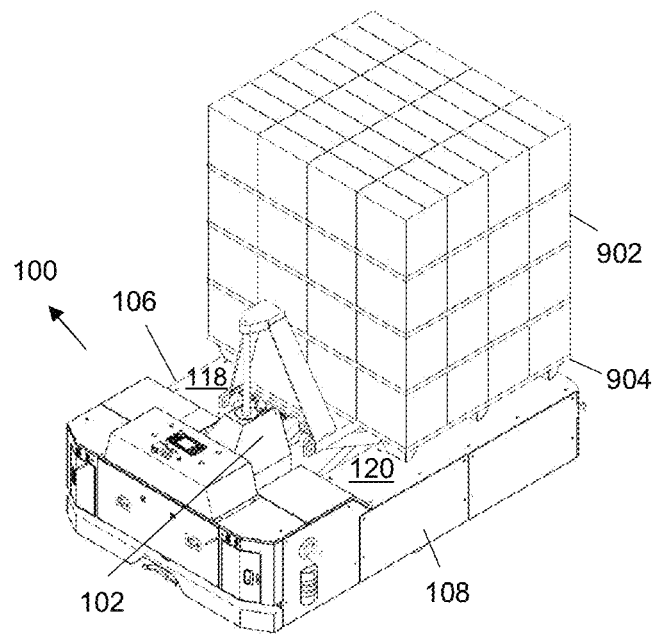
FIG. 13 shows the mobile robot of FIG. 12, wherein the lifting device carrying the payload of FIG. 9 has retracted and the payload is above the mobile robot.

FIG. 13 shows a configuration of the mobile device 100 after step 7, wherein the lifting device 102 is retracted from the extended configuration. The forks (103; not visible in FIG. 12) are still in an elevated configuration. The forks 103 and the payload 902 lifted by them are now located directly above the heights of the top portion 118 of the first side wall 106 and the top portion 120 of the second side wall 108.

At a step 8, the mobile robot 100 controls the lifting device 102 to lower the forks 103 into a non-elevated configuration and let the pallet 904 rests on the load bearing surfaces i.e., the top portions 118 and 120 of the first side wall 106 and the second side wall 108 of the mobile robot 100.

After the forks 103 of the lifting device 102 are in the non-elevated configuration, the one or more actuators 112, 113, 406 and 408 are activated to engage the lifting device 102 and lift the lifting device 102 so that the wheels 412 and 414 of the lifting device 102 are off the ground and the lifting device 102 is changed into the stowed configuration. Thereafter, the one or more actuators 112, 113, 406, 408 stay in their position to support the lifting device 102 in its stowed configuration, as the mobile robot 100 autonomously moves to transport the payload 902 to the intended location.

Figure 14:
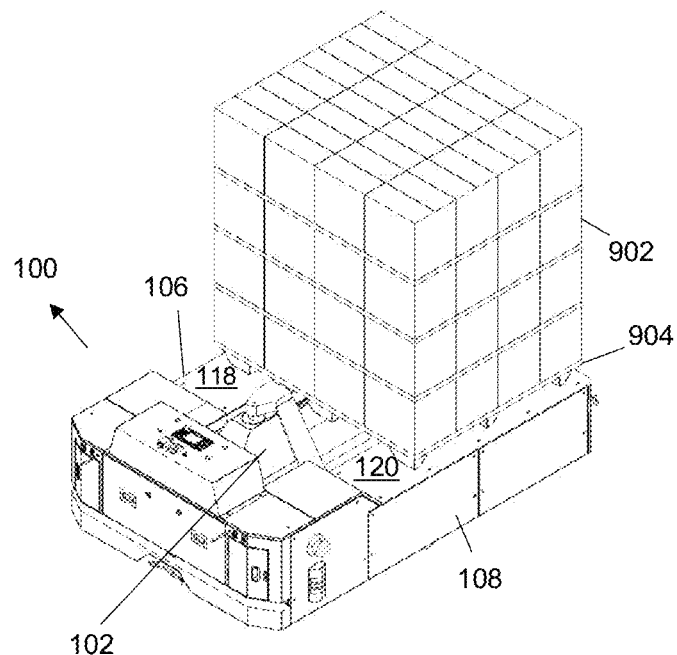
FIG. 14 shows the mobile robot of FIG. 13, wherein the lifting device has been lowered to rest the payload on the mobile robot and the lifting device is in a stowed configuration.

FIG. 14 shows a configuration of the mobile device 100 when the lifting device 102 is in the stowed configuration and the payload 902 is resting on the load bearing surfaces i.e., the top portions 118 and 120 of the first side wall 106 and the second side wall 108 of the mobile robot 100.

At a step 9, the mobile robot 100 carrying the payload 902 reaches the intended location and activates the one or more actuators 112, 113, 406, and 408 to lower the forks 103 until the wheels 412 and 414 of the lifting device 102 rest on the ground. The one or more actuators 112, 113, 406, and 408 are disengaged from the lifting device 102 when the forks 103 rest on the ground.

At a step 10, the forks 103 are raised or elevated to a predetermined height above the heights of the load bearing surfaces (i.e., 118 and 120) to carry the payload 902 resting on the load bearing surfaces (i.e., 118 and 120).

At a step 11, with the lifting device 102 carrying the payload 902 staying stationary, the mobile robot 100 moves itself until the lifting device 102 is changed into the extended configuration. Thereafter, the elevated forks 103 carrying the payload 902 are lowered to place the payload 902 on the ground. Alternatively, the motor mounted to the side members 302 and 304 is controlled to move the side members 302 and 304 to push the lifting device 102 carrying the payload 902 into the extended configuration.

At a step 12, after the payload 902 is placed on the ground and the forks 103 are free from carrying the payload 902, the mobile robot 100 can either
A) retract the lifting device 102 into the space 116 by controlling the motor to move the side members 302 and 304, which moves the lifting device 102, or
B) move itself until the forks 103 are entirely outside of the pallet 904 and then with the lifting device 102 staying stationary, move itself again until the lifting device 102 resides in the space 116.

At a step 13, after the lifting device 102 resides in the space 116, the one or more actuators 112, 113, 406, 408 are activated to engage the lifting device 102 and lift the lifting device 102 to change it into the stowed configuration, wherein the wheels 412 and 414 of the lifting device 102 are above ground. The entire process of moving a payload 902 by the mobile device 100 from one location to another is now complete.

The mobile robot 100 in FIG. 1 and FIG. 2 above are not limited to the specific configurations and operations as described above. In other examples, mobile robots with similar configurations and operations are also applicable.

An example of the apparatus of the present disclosure (e.g., the mobile robot 100 described with reference to the earlier figures) may have the following components in electronic communication via a bus:
1. optionally, a display (e.g., the display in the control panel 122 in FIG. 1),
2. non-volatile memory and/or non-transitory computer readable medium,
3. random access memory ("RAM"),
4. N number of processing components (i.e., "one or more controllers", "one or more processors" or "one or more central processing units"; for example, the controller, processor, or processing unit of the mobile robot 100 described above), 5. a transceiver component that includes N number of transceivers for Internet/Intranet use, and/or Wireless Network communications,
6. optionally, user controls i.e., user input devices,
7. optionally, image capturing components,
8. optionally, audio signal capturing components (e.g., microphone),
9. optionally, audio speakers, or sound producing devices to, for example, indicate operation status,
10. where required, one or more sensors and/or components for alignment purposes, obtaining information from a machine readable optical code and/or Radio Frequency Identification tag, and/or navigation/area mapping purposes,
11. optionally, Input/Output interfaces for connecting to the user input devices (such as mouse, joystick, keyboard, sensors for detecting user gestures, and the like), the audio speakers, display, image capturing components and/or audio signal capturing components,
12. optionally, one or more electrical connector for supplying power to or receiving power from the load and/or for data communication (e.g., for controlling operations of the load) with the attached load,
13. optionally, indicator light or lights for alerting and/or status notification purposes.

The display generally operates to provide a presentation of graphical content (e.g., graphical user interface) to a user, and may be realized by any of a variety of displays (e.g., CRT, LCD, HDMI, micro-projector, and OLED displays). The display may be a touchscreen.

In general, the non-volatile memory functions to store (e.g., persistently store) data and executable code including code that is associated with the functional components of the mobile robot. In some cases, for example, the non-volatile memory includes bootloader code, modem software, operating system code, file system code, as well as other codes well known to those of ordinary skill in the art that are not depicted for simplicity. For example, the mobile robot 100 may be programmed with self-navigation/mapping code, code to facilitate the docking/undocking processes of the mobile robot 100 with a charging station (e.g., 128 in FIG. 1) for charging up the power supply of the mobile robot 100, code to control alignment process of the mobile robot 100 with a payload, code to control retraction and extension of the one or more actuators (e.g., 112 in FIGS. 1 and 113 in FIG. 2) for supporting the lifting device (e.g., 102 in FIG. 1) in the stowed configuration, code to control the one or more actuators to lift or lower the lifting device, code for movement control to let the lifting device change into the stowed configuration and the extended configuration, and code to control the lifting device to lift or lower payload.

In many implementations, the non-volatile memory is realized by flash memory (e.g., NAND or NOR memory), but it is certainly contemplated that other memory types may be utilized as well. Although it may be possible to execute the code from the non-volatile memory, the executable code in the non-volatile memory is typically loaded into RAM and executed by one or more of the N processing components.

One or more computer programs may be stored on any machine or computer readable medium that may be non-transitory in nature. The computer readable medium may include storage devices such as magnetic or optical disks, memory chips, or other storage devices suitable for interfacing with the mobile robot. The machine or computer readable medium may also include a hard-wired medium such as exemplified in the Internet system, or wireless medium such as exemplified in the Wireless LAN (WLAN) system.

The N processing components (or "one or more processors") in connection with RAM generally operate to execute the instructions stored in non-volatile memory to effectuate the functional components. As one skilled in the art (including ordinarily skilled) will appreciate, the N processing components may include a video processor, modem processor, DSP, graphics processing unit (GPU), and other processing components.

The transceiver component may include N transceiver chains, which may be used for communicating with extremal devices via wireless networks. Each of the N transceiver chains may represent a transceiver associated with a particular communication scheme. For example, each transceiver may correspond to protocols that are specific to local area networks, cellular networks (e.g., a WIFI network, a CDMA network, a GPRS network, a UMTS networks), and other types of communication networks. In some implementations, the communication of the transceiver component with communication networks enables a location of connected devices to be determined.

Examples of the present disclosure may have the following features. Reference numerals of elements in the figures of the present disclosure are that are examples of these features are stated.

An apparatus (e.g., 100) for moving a payload, wherein the apparatus comprises:
  a power supply,
  one or more parts for mobility (e.g., 402, 404, 410),
  a driving mechanism for driving the one or more parts for mobility to move the apparatus,
  a lifting device (e.g., 102) for lifting a payload (e.g., 902),
  a body comprising one or more load bearing surfaces (e.g., 118, 120), a central wall (e.g., 104), a first side wall (e.g., 106) and a second side wall (108), wherein the central wall, the first side wall and the second side wall are arranged to form a boundary defining a space (e.g., 116) for residing the lifting device,
  one or more attachment members (e.g., 302, 304) mounted to the lifting device; and
  a processor configured to execute instructions in a memory to operate the apparatus to:
  control the lifting device to lift the payload,
  control the lifting device to place the payload on the one or more load bearing surfaces,
  control the driving mechanism to move the apparatus to transport the payload resting on the one or more load bearing surfaces to an intended location,
  wherein the lifting device is in a stowed configuration when not in use and is changeable into an extended configuration,
  wherein the first side wall and/or the second side wall comprises:
  one or more actuators (e.g., 112, 113, 406, 408, 500) comprising an extendable member (e.g., 504) extendable into the space to engage and support the lifting device at above ground level in the stowed configuration.

The lifting device may have wheels, and the wheels are above ground level when the lifting device is in the stowed configuration.

The number of the one or more actuators may be at least four, wherein a first actuator is located at a bottom of the first side wall closer to the central wall, a second actuator (e.g., 112) is located at a bottom of the first side wall further away from the central wall and closer to an end of the first side wall, a third actuator is located at a bottom of the second side wall closer to the central wall, and a fourth actuator (e.g. 113) is located at a bottom of the second side wall further away from the central wall and closer to an end of the second side wall.

The apparatus may be operable to when the lifting device is carrying the payload, with the lifting device staying stationary, control the driving mechanism to move the apparatus until the lifting device is out of the space and is changed into the extended configuration, or control the driving mechanism to move the apparatus until the lifting device is not in the extended configuration and is in the space.

The one or more load bearing surfaces may comprise a top portion (e.g., 118) of the first side wall and a top portion (e.g., 120) of the second side wall, wherein the apparatus is operable to:
  control the lifting device to lift the payload to a position higher than the height of the top portion of the first side wall and the height of the top portion of the second side wall,
  control the lifting device to lower the payload to place the payload on the top portion of the first side wall and the top portion of the second side wall and to change into the stowed configuration; and
  control the one or more actuators to engage and support the lifting device at above ground level in the stowed configuration.

The apparatus may be operable to:
  control the lifting device to lift a payload placed on the one or more load bearing surfaces,
  perform movement control to let the lifting device change into the extended configuration,
  control the lifting device in the extended configuration to lower and place the payload at the intended location,
  perform movement control to let the lifting device change into the stowed configuration; and
  control the one or more actuators to engage and support the lifting device at above ground level in the stowed configuration.

In the case that the one or more load bearing surfaces comprise a top portion (e.g. 118) of the first side wall and a top portion (e.g. 120) of the second side wall, the body is configured such that outermost edges of the central wall, the first side wall and the second side wall determine the dimensions of a footprint of the apparatus, and the distance between the first side wall and the second side wall are configured such that the payload is able to be placed on the one or more load bearing surfaces and the length and width of a base of the payload does not exceed the dimensions of the footprint.

The payload comprises a pallet (e.g., 904) and the lifting device comprises a pair of forks (e.g., 103), and when the lifting device is in the extended configuration, the pair of forks are insertable into gaps at a bottom of the pallet.

The apparatus may comprise:
  a motor connected to the one or more attachment members, wherein the motor is controllable to move the one or more attachment members,
  a pair of tracks (e.g., 126, 127), wherein each track is located on the first side wall and the second side wall respectively,
  wherein at least two of the one or more attachment members are mounted to left and right sides of the lifting device respectively,
  wherein the apparatus is operable to:
    control the motor to move the at least two attachment members to slide along the pair of tracks, which move the lifting device in a direction away from the central wall and thereby change the lifting device into the extended configuration, or towards the central wall into the space.

The one or more actuators may be configured to engage and lift the lifting device to change into the stowed configuration, wherein no portion (e.g., wheels, tracks and/or other parts for mobility) of the lifting device is contacting ground in the stowed configuration.

The one or more actuators may be configured to lower the lifting device in the stowed configuration until one or more portions (e.g., wheels, tracks and/or other parts for mobility) of the lifting device rest on ground.

The extendable member comprises a sloped edge (e.g., 504) movable to contact a bottom portion of the lifting device (e.g., bottom of the fork 103 of the lifting device 102) and push against the bottom portion of the lifting device to lift the lifting device according to a gradient of the sloped edge.

In the specification and claims, unless the context clearly indicates otherwise, the term "comprising" has the non-exclusive meaning of the word, in the sense of "including at least" rather than the exclusive meaning in the sense of "consisting only of". The same applies with corresponding grammatical changes to other forms of the word such as "comprise", "comprises" and so on.

While the invention has been described in the present disclosure in connection with a number of examples and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

The invention claimed is:
1. An apparatus for moving a payload, wherein the apparatus comprises:
  a power supply;
  one or more parts for mobility;
  a driving mechanism for driving the one or more parts for mobility to move the apparatus;
  a lifting device for lifting a payload;
  a body comprising one or more load bearing surfaces, a central wall, a first side wall and a second side wall, wherein the central wall, the first side wall and the second side wall are arranged to form a boundary defining a space for residing the lifting device;
  one or more attachment members mounted to the lifting device; and
  a processor configured to execute instructions in a memory to operate the apparatus to:
    control the lifting device to lift the payload;
    control the lifting device to place the payload on the one or more load bearing surfaces;
    control the driving mechanism to move the apparatus to transport the payload resting on the one or more load bearing surfaces to an intended location,
  wherein the lifting device is in a stowed configuration when not in use and is changeable into an extended configuration,
  wherein the first side wall and/or the second side wall comprises:
    one or more actuators comprising an extendable member extendable from the first side wall or the second side wall into the space to engage and support the lifting device at above ground level in the stowed configuration, wherein, when the lifting device is in the extended configuration, the extendable member is disposed on the first side wall or the second side wall, spaced apart from the lifting device.

2. The apparatus as claimed in claim 1, wherein the lifting device has wheels, and the wheels are above ground level when the lifting device is in the stowed configuration.

3. The apparatus as claimed in claim 1, wherein the number of the one or more actuators is at least four, wherein a first actuator is located at a bottom of the first side wall closer to the central wall, a second actuator is located at a bottom of the first side wall further away from the central wall and closer to an end of the first side wall, a third actuator is located at a bottom of the second side wall closer to the central wall, and a fourth actuator is located at a bottom of the second side wall further away from the central wall and closer to an end of the second side wall.

4. The apparatus as claimed in claim 1, wherein the apparatus is operable to:

when the lifting device is carrying the payload, with the lifting device staying stationary, control the driving mechanism to move the apparatus until the lifting device is out of the space and is changed into the extended configuration, or control the driving mechanism to move the apparatus until the lifting device is not in extended configuration and is in the space.

5. The apparatus as claimed in claim 1, wherein the one or more load bearing surfaces comprise a top portion of the first side wall and a top portion of the second side wall, wherein the apparatus is operable to:

control the lifting device to lift the payload to a position higher than the height of the top portion of the first side wall and the height of the top portion of the second side wall;

control the lifting device to lower the payload to place the payload on the top portion of the first side wall and the top portion of the second side wall and to change into the stowed configuration; and control the one or more actuators to engage and support the lifting device at above ground level in the stowed configuration.

6. The apparatus as claimed in claim 1, wherein the apparatus is operable to:

control the lifting device to lift a payload placed on the one or more load bearing surfaces;

perform movement control to let the lifting device change into the extended configuration;

control the lifting device in the extended configuration to lower and place the payload at the intended location;

perform movement control to let the lifting device change into the stowed configuration; and control the one or more actuators to engage and support the lifting device at above ground level in the stowed configuration.

7. The apparatus as claimed in claim 1, wherein in the case that the one or more load bearing surfaces comprise a top portion of the first side wall and a top portion of the second side wall, the body is configured such that outermost edges of the central wall, the first side wall and the second side wall determine the dimensions of a footprint of the apparatus, and the distance between the first side wall and the second side wall are configured such that the payload is able to be placed on the one or more load bearing surfaces and the length and width of a base of the payload does not exceed the dimensions of the footprint.

8. The apparatus as claimed in claim 1, wherein the payload comprises a pallet and the lifting device comprises a pair of forks, and when the lifting device is in the extended configuration, the pair of forks are insertable into gaps at a bottom of the pallet.

9. The apparatus as claimed in claim 1, wherein the apparatus comprises:

a motor connected to the one or more attachment members, wherein the motor is controllable to move the one or more attachment members;

a pair of tracks, wherein each track is located on the first side wall and the second side wall respectively, wherein at least two of the one or more attachment members are mounted to left and right sides of the lifting device respectively, wherein the apparatus is operable to:

control the motor to move the at least two attachment members to slide along the pair of tracks, which move the lifting device in a direction away from the central wall and thereby change the lifting device into the extended configuration, or towards the central wall into the space.

10. The apparatus as claimed in claim 1, wherein the one or more actuators are configured to engage and lift the lifting device to change into the stowed configuration, wherein no portion of the lifting device is contacting ground in the stowed configuration.

11. The apparatus as claimed in claim 1, wherein the one or more actuators are configured to lower the lifting device in the stowed configuration until one or more portions of the lifting device rest on ground.

12. The apparatus as claimed in claim 1, wherein the extendable member comprises a sloped edge movable to contact a bottom portion of the lifting device and push against the bottom portion of the lifting device to lift the lifting device according to a gradient of the sloped edge.

13. The apparatus as claimed in claim 1, wherein the extendable member is extendable from the first side wall or the second side wall toward the other side wall.

14. The apparatus as claimed in claim 1, wherein the lifting device moves relative to the extendable member from the stowed configuration to the extended configuration.

15. The apparatus as claimed in claim 1, further comprising a drive unit for moving the extendable member from the first side wall or the second side wall into the space.

16. An apparatus for moving a payload, wherein the apparatus comprises:

a power supply;

one or more parts for mobility;

a driving mechanism for driving the one or more parts for mobility to move the apparatus;

a lifting device for lifting a payload;

a body comprising one or more load bearing surfaces, a central wall, a first side wall and a second side wall, wherein the central wall, the first side wall and the second side wall are arranged to form a boundary defining a space for residing the lifting device;

one or more attachment members mounted to the lifting device; and a processor configured to execute instructions in a memory to operate the apparatus to:

control the lifting device to lift the payload;

control the lifting device to place the payload on the one or more load bearing surfaces;

control the driving mechanism to move the apparatus to transport the payload resting on the one or more load bearing surfaces to an intended location,
wherein the lifting device is in a stowed configuration when not in use and is changeable into an extended configuration,
wherein the first side wall and/or the second side wall comprises:
one or more actuators comprising an extendable member extendable into the space to engage and support the lifting device at above ground level in the stowed configuration,
wherein the number of the one or more actuators is at least four, wherein a first actuator is located at a bottom of the first side wall closer to the central wall, a second actuator is located at a bottom of the first side wall further away from the central wall and closer to an end of the first side wall, a third actuator is located at a bottom of the second side wall closer to the central wall, and a fourth actuator is located at a bottom of the second side wall further away from the central wall and closer to an end of the second side wall.

17. An apparatus for moving a payload, wherein the apparatus comprises:
a power supply;
one or more parts for mobility;
a driving mechanism for driving the one or more parts for mobility to move the apparatus;
a lifting device for lifting a payload;
a body comprising one or more load bearing surfaces, a central wall, a first side wall and a second side wall, wherein the central wall, the first side wall and the second side wall are arranged to form a boundary defining a space for residing the lifting device;
one or more attachment members mounted to the lifting device; and
a processor configured to execute instructions in a memory to operate the apparatus to:
control the lifting device to lift the payload;
control the lifting device to place the payload on the one or more load bearing surfaces;
control the driving mechanism to move the apparatus to transport the payload resting on the one or more load bearing surfaces to an intended location,
wherein the lifting device is in a stowed configuration when not in use and is changeable into an extended configuration,
wherein the first side wall and/or the second side wall comprises:
one or more actuators comprising an extendable member extendable into the space to engage and support the lifting device at above ground level in the stowed configuration,
wherein the apparatus is operable to:
when the lifting device is carrying the payload, with the lifting device staying stationary, control the driving mechanism to move the apparatus until the lifting device is out of the space and is changed into the extended configuration, or control the driving mechanism to move the apparatus until the lifting device is not in extended configuration and is in the space.

* * * * *